Aug. 30, 1927.  G. F. BEACHLER  1,640,920
SPHYGMOMANOMETER
Filed Oct. 27, 1924   3 Sheets-Sheet 2

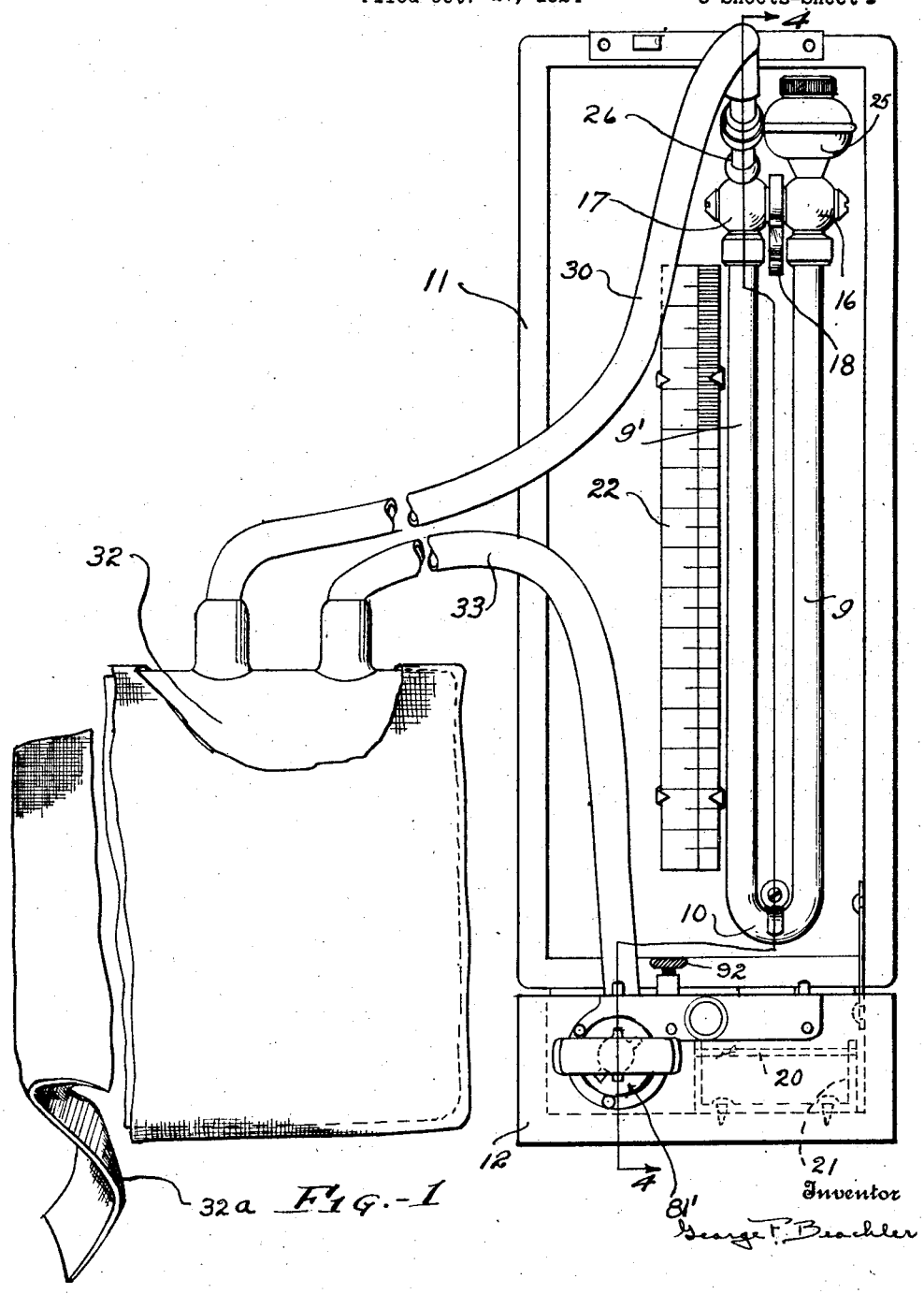

Inventor
George F. Beachler
By Bates, Macklin, Goldrick & Teare
Attorney

Aug. 30, 1927.
G. F. BEACHLER
1,640,920
SPHYGMOMANOMETER
Filed Oct. 27, 1924
3 Sheets-Sheet 3
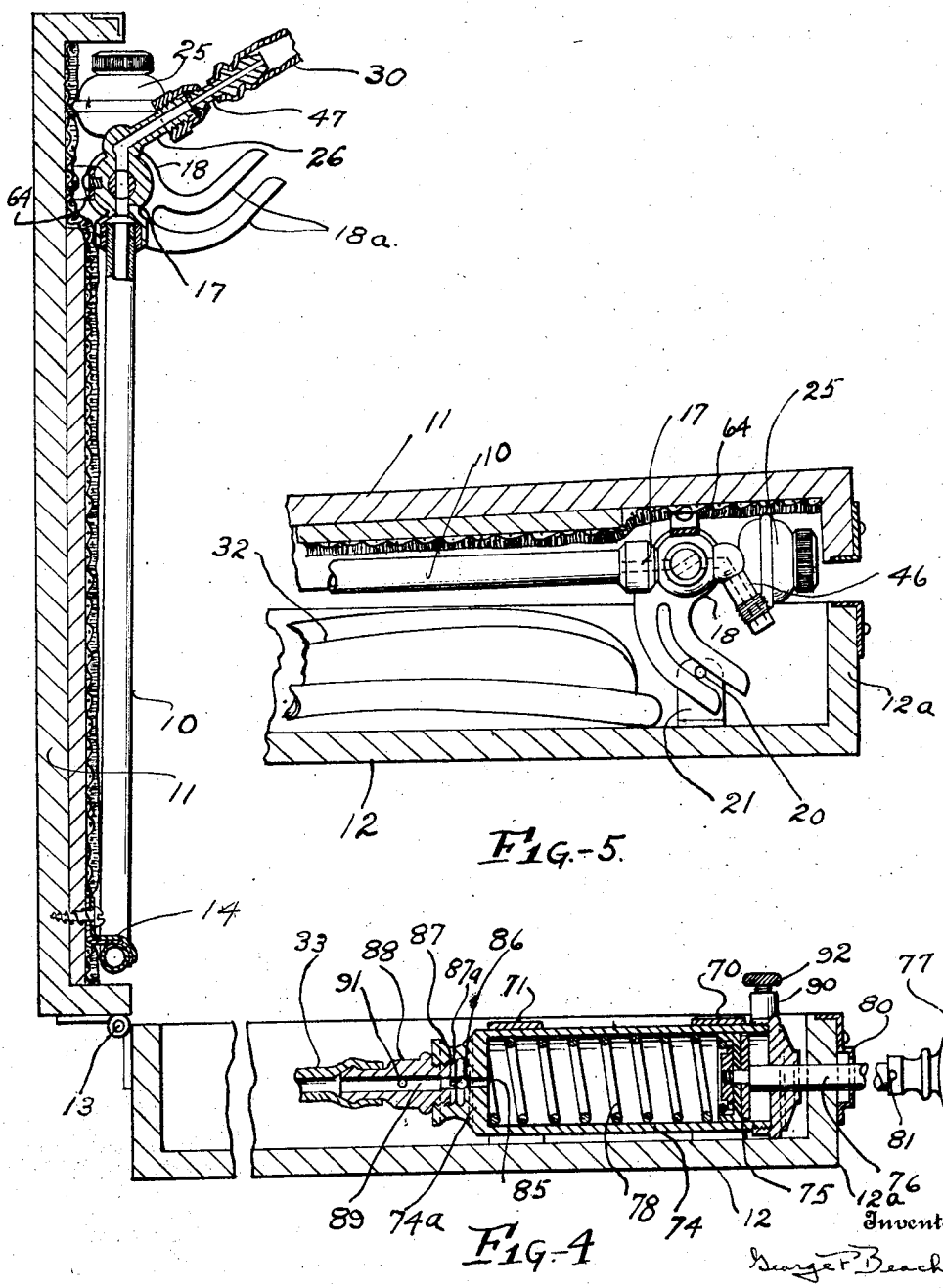

Patented Aug. 30, 1927.

1,640,920

UNITED STATES PATENT OFFICE.

GEORGE F. BEACHLER, OF CLEVELAND, OHIO.

SPHYGMOMANOMETER.

Application filed October 27, 1924. Serial No. 745,999.

This invention relates to sphygmomanometers, and is particularly concerned with portable instruments of the mercury column type.

The general object of the present invention is the provision of a compact instrument capable of a full range of measurements and enclosed in a pocket case in such manner that the mercury in the instrument will be prevented from being displaced when the case is closed.

Another object of my invention includes a casing construction adapted to the housing of a sphygmomanometer which when open supports the mercury column of the instrument vertically and also forms a base for the instrument, the base portion of the casing comprising a support for a pump which is adapted to inflate a tourniquet bag attached to the mercury column.

A further object of this invention includes the provision of a novel mercury tube construction which becomes automatically and positively sealed by the act of closing the casing.

A still further object of my invention is the provision of a blood pressure measuring instrument of unusual measuring range and which is arranged in a pocket case in such manner that the instrument may be held and manipulated by one hand of the user.

Other objects of my invention will hereinafter be set forth in the following description referring to the accompanying drawings illustrating a preferred form thereof. The essential characteristics are summarized in the claims.

Figure 3:
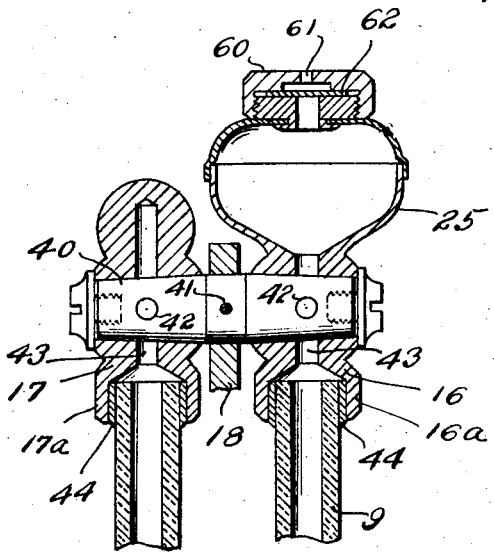
Figure 2:
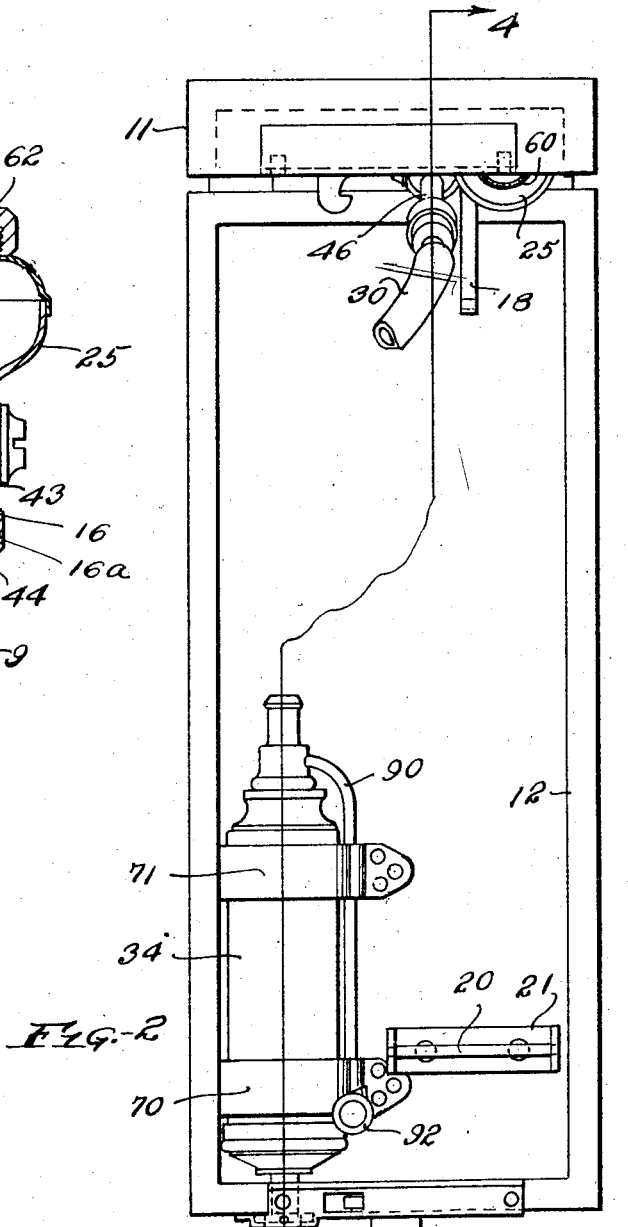

In the drawings, Fig. 1 is a front elevation of my instrument supported by a casing which is of sufficient size to also receive a tourniquet bag, when the latter is deflated and folded; Fig. 2 is a plan view of the instrument and casing, the tourniquet bag and connections therefor being omitted; Fig. 3 is a vertical cross-section section taken at the upper end of the tube as shown in Fig. 1; Fig. 4 is an enlarged cross-sectional elevation taken substantially along the line 4—4 of Fig. 2; Fig. 5 is an enlarged cross-sectional detail view on an enlarged scale taken through the casing when closed showing the means of automatically sealing the mercury tube, operating the valve mechanism.

My invention contemplates the provision of a sphygmomanometer of the mercury column type capable of measuring blood pressures up to 300 millimeters, the instruments having such a range of measurement heretofore have been constructed in large sizes and the use thereof has necessarily been restricted to offices, but by providing a novel mercury tube construction, I am enabled to arrange a compact and efficient instrument in a pocket case which comprises a part of the instrument.

The mercury column comprises a U-shaped tube having a valve mechanism closing each leg thereof and a reservoir associated with one of the valve mechanisms whereby the over-all length of the tube may be considerably restricted to adapt it to a pocket instrument. As shown in Fig. 1 of the drawing, the mercury tube 10 is secured to the inner face of a casing cover 11 hingedly connected to the casing 12 as shown at 13 whereby the cover may be swung to a vertical position, as shown in Fig. 4, while the casing proper remains horizontal and comprises a base for the instrument. The tube 10 may be secured to the casing by any convenient means such as by a clasp 14. The legs 9 and 9' of the tube are provided at their upper end with valve mechanisms 16 and 17 respectively operated by a bifurcated lever member 18 which engages a rod 20 supported by a bracket 21 secured to the casing 12 as will be hereinafter described. Adjacent the leg 9' of the tube is a calibrated scale 22 and disposed at the top of the other leg is a bell member 25 comprising a reservoir into which the mercury may be forced from the leg 9 when pressure is exerted on the top of the mercury column in the leg 9'. A detachable connection 26 is provided on the valve member 17 affording attachment for a tubular member 30 extending to the tourniquet bag 32. A second tubular member 33 extends from the tourniquet bag to a pump 34 disposed within and secured to the casing member 12 in such manner that the operating member 35 thereof may extend outside of the casing whereby the casing may be held and the pump operated by using but one hand. As shown in Fig. 2, the pump is disposed in the casing out of alignment with the mercury tube mechanism whereby space is provided for receiving the tourniquet bag 32 when the instrument is not in use.

The valve mechanisms 16 and 17 are similar in construction and are mounted upon the leg ends of the mercury tube in sealed relation thereto and have a common valve member 40 operated by member 18 and provided with transverse passageways 42 adapted to be brought into alignment with passageways 43 formed in the members 16 and 17. The valve member 17 is provided with a branch 26 to which may be detachably connected a coupling member 47 carried by the end of the tourniquet bag tube 30, the coupling and branch of course having passageways formed therein communicating with the passageway 43 of the valve whereby, when pressure is exerted in the bag a corresponding pressure is exerted upon the top of the mercury column, in the leg 9', of the tube, thus causing the mercury to be depressed in the tube in the leg 9' of the tube and to be forced upwardly in the leg 9 of the tube, through the passageway 43 of the valve 16 into a reservoir 25.

As shown in Fig. 3, the reservoir is provided with a cap 60 having an aperture 61 for permitting the escape of air from the reservoir. The cap serves as clamping means to hold a diaphragm 62 in position to cover the aperture 61. The diaphragm 62 is formed of a material which will permit the escape of air from the reservoir 25 but which is impervious to mercury. I find that a chamois skin is quite serviceable for this purpose.

It will be seen that this valve arrangement is such that when the casing member 11 is swung into closing relation with the base portion 12, that the member 18 will come into engagement with the pin 20 and by reason of the curved or camming surfaces of the bifurcated end portion 18$^a$, the valve member 40 will be rotated a sufficient distance to cause the apertures 42 thereof to be turned out of alignment with the valve passageways 43 thus effectively sealing the ends of the mercury tube. Likewise when the lid or cover portion of the casing is elevated, the action of the lever member is such that it turns the valve member to a position which will align the passageways 42 and 43 of the respective valve members.

To insure an acurate operation of the valve members, in the foregoing described manner, I provide bracket members 64 which are secured to the casing member 11 and to the valve members 16 and 17. Thus the upper end of the mercury tube is firmly held without undue pressure or stress being exerted upon the glass portion of the tube.

The bag 32 may comprise the usual tourniquet, namely an inner inflatable rubber bag and an outer fabric cover 32$^a$, the bag and cover being of considerable length whereby it may be wrapped about the limb of the patient two or three times.

The pump 34 for inflating the bag may be rigidly secured to the casing member 12 by bracket members 70 and 71. This pump may comprise a piston spring actuated on the suction stroke and manually actuated on the compression stroke.

The pump 34 is provided with the usual cylinder 74 and piston structure 75 operated by a plunger 76 which is of sufficient length to extend through the end of the casing adjacent one side thereof. The handle 77 on the stem is of such shape that the casing member 12 may be grasped with the fingers and the pump moved inwardly by pressure exerted from the ball of the hand.

The pump piston 75 and the operating stem 76 are maintained in a normally outward position by a spring member 78 disposed within the cylinder 74, the stem 76 being of sufficient length to extend through the end wall 12$^a$ of the casing member 12 and a catch or detent 80 with wing slots 81' is provided on the outer side of the wall 12$^a$ of the casing to engage a pin 81 on the stem handle 77 whereby, when the instrument is not being used, the stem 76 may be rotated about a quarter turn as in a breach lock maintained in an innermost position in opposition to the spring 78. The discharge end of the pump is provided with a check valve and also a release valve connection and, as shown in Fig. 4, the inner end 74$^a$ of the cylinder is provided with an aperture 85 which is sealed by a check ball 86 held in a normally operative position by the inner slotted end 87 of a coupling member 88. The coupling 88 has the valve end thereof in threaded engagement with a suitably threaded aperture formed in the end 74$^a$ of the pump and serves as a connection for the tourniquet bag tube 33. The end 87 of the coupling member 88 is provided with radial slots 87$^a$ which permit the compressed air from the pump to flow through the passageway 89 of the coupling member 88 around the ball 86. Upon an outward stroke of the stem 76 of the pump, the ball 86 becomes seated and seals the aperture 85. Upon an inward stroke however, the ball is forced against the ends of the member 88 and the air flows into the tube 33 of the tourniquet bag 32.

To relieve the pressure in the bag 32 in a gradual manner, a release valve is arranged on the pump to be operated in such manner that the physician may have the use of one hand to detect the re-occurrence of pulsation while holding the instrument and stroking the pump with the other hand. As shown in Figs. 2 and 4, a release valve is provided which may comprise a tubular member 90 providing a passageway 91 extending from the coupling member 88 of the pump forwardly to a position alongside of the pump at the operative end of the casing, the member 90 extending upwardly to an accessible position. The release valve proper comprises an ordinary needle screw 92 controlling the passageway of the member 90 and is disposed above the casing 12, thus permitting the physician to operate or relieve the pressure in the bag 32 while retaining his grip on the instrument.

I claim:

1. In a sphygmomanometer, the combination of a U-shaped tube, a single valve member controlling both legs of the tube, an openable casing containing the tube and valve, means whereby the closing of the casing operates the valve and a tourniquet bag connected with one of the legs through said valve.

2. In a sphygmomanometer, the combination of a casing comprising two hingedly connected members, a mercury tube mounted on one member, a mercury reservoir mounted above one leg of the tube and in communication with it, said tube being U-shaped, the legs of the tube being of equal length, valves for closing the legs of the tube, and means for automatically closing and opening the valves upon closing and opening the casing respectively.

3. In a sphygmomanometer of the character described, the combination of a U-shaped mercury tube having legs of equal length, a valve mechanism for closing the legs of the tube and a single member for operating said valve mechanism simultaneously.

4. In a sphygmomanometer of the character described, the combination of a U-shaped mercury tube having legs of equal length a valve mechanism for closing the legs of the tube, a single member for operating said valve mechanisms and a mercury reservoir on one of the legs adjacent one of said valves.

5. In a sphygmomanometer the combination of a casing comprising two hingedly connected members, a mercury tube supported by one of the members, said tube being U-shaped, valve members for closing the legs of the tube, a single member for operating said valve mechanism and means carried by the other member of the casing for operating said single member when the casing is being closed and opened.

6. In a sphygmomanometer the combination of a casing comprising two hingedly connected members, a mercury tube supported by one of the members, said tube being U-shaped, valve members for closing the legs of the tube, a single member for operating said valve mechanism and means carried by the other member of the casing for operating said single member when the casing is being closed and opened, a pump disposed in the casing adjacent said means, the pump having an operating handle extending through the casing and a relief valve controlling the back pressure on the pump and disposed within the casing but adjacent said handle.

7. In a sphygmomanometer the combination of a casing comprising two hingedly connected members, a mercury tube supported by one of the members, said tube being U-shaped, valve members for closing the legs of the tube, a single member for operating said valve mechanism said member being bifurcated and means carried by the other member of the casing for operating said single member when the casing is being closed, said means including a member adapted to extend between the bifurcated portions of the valve operating member.

In testimony whereof, I hereunto affix my signature.

GEORGE F. BEACHLER.